(12) United States Patent
Peacock

(10) Patent No.: US 11,840,877 B2
(45) Date of Patent: Dec. 12, 2023

(54) COMPOSITE AUTOMATIC GATE PADDLE

(71) Applicant: Cubic Corporation, San Diego, CA (US)

(72) Inventor: Colin Peacock, Crawley (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 17/862,850

(22) Filed: Jul. 12, 2022

(65) Prior Publication Data

US 2023/0025788 A1 Jan. 26, 2023

Related U.S. Application Data

(60) Provisional application No. 63/221,308, filed on Jul. 13, 2021.

(51) Int. Cl.
| | |
|---|---|
| *E06B 11/08* | (2006.01) |
| *B32B 3/12* | (2006.01) |
| *B32B 3/26* | (2006.01) |
| *B32B 7/12* | (2006.01) |
| *B32B 15/14* | (2006.01) |
| *B32B 15/20* | (2006.01) |
| *B32B 5/02* | (2006.01) |

(52) U.S. Cl.
CPC ............ *E06B 11/085* (2013.01); *B32B 3/12* (2013.01); *B32B 3/263* (2013.01); *B32B 7/12* (2013.01); *B32B 15/14* (2013.01); *B32B 15/20* (2013.01); *B32B 5/022* (2013.01); *B32B 5/024* (2013.01); *B32B 2260/023* (2013.01); *B32B 2260/046* (2013.01); *B32B 2262/101* (2013.01); *B32B 2262/106* (2013.01); *B32B 2305/024* (2013.01); *B32B 2307/3065* (2013.01); *B32B 2307/72* (2013.01); *B32B 2307/732* (2013.01); *B32B 2307/746* (2013.01)

(58) Field of Classification Search
CPC .............. B32B 3/263; B32B 2260/023; B32B 2260/046; B32B 2305/024; E06B 11/02–085
See application file for complete search history.

(56) References Cited

U.S. PATENT DOCUMENTS

| | | | |
|---|---|---|---|
| 4,686,806 A | 8/1987 | Bennett | |
| 8,127,492 B1 * | 3/2012 | Hellman, Sr. | ........ E06B 11/085 49/49 |

(Continued)

FOREIGN PATENT DOCUMENTS

DE 102016106124 A1 10/2017

*Primary Examiner* — Jasper Saberi
(74) *Attorney, Agent, or Firm* — MUGHAL GAUDRY & FRANKLIN PC

(57) ABSTRACT

Embodiments of the present invention may encompass gate-line paddles that include a paddle body having a composite material forming an outer surface of the paddle body. The composite material may have a first surface and a second surface opposite the first surface that define an open interior therebetween. The composite material may include a fiber-reinforced resin. The paddle body may include a cellular reinforcement member disposed within the open interior. The paddle body may include a mounting region formed along a lateral edge of the paddle body. The paddle body may include a mounting block disposed within a portion of the open interior disposed within the mounting region.

20 Claims, 5 Drawing Sheets

(56) References Cited

U.S. PATENT DOCUMENTS

| | | | |
|---|---|---|---|
| 2004/0083666 A1 | 5/2004 | Sudo | |
| 2006/0218863 A1* | 10/2006 | Eshel | E06B 11/085 49/49 |
| 2019/0145169 A1* | 5/2019 | Marquart | G07C 9/15 49/46 |
| 2021/0396060 A1* | 12/2021 | Gendig | E05F 15/614 |

* cited by examiner

COMPOSITE AUTOMATIC GATE PADDLE

CROSS-REFERENCES TO RELATED APPLICATIONS

This application claims the benefit of U.S. Provisional Application Ser. No. 63/221,308, filed on Jul. 13, 2021, entitled "COMPOSITE AUTOMATIC GATE PADDLE", the disclosure of which is incorporated by reference herein in its entirety.

BACKGROUND OF THE INVENTION

Conventional paddles and other barriers in automatic gate systems are often heavy, which over time, causes wear on the drive train that moves the paddles between open and closed states. This wear leads to the drive train needing to be serviced and/or replaced, which may take a given gate or other access point out of service for a period of time, as well as increase costs and manual labor requirements. Additionally, the outer surface materials of conventional paddles or other barriers often wear out and/or create friction when in contact with users and may subsequently contribute to users becoming trapped between paddles if the paddles close on the user. Conventional barrier gate barriers also typically do not fully satisfy fire safety standards due to the materials used to construct the barriers. Thus, improvements in gate barrier design and construction are desired.

BRIEF SUMMARY OF THE INVENTION

Embodiments of the present invention may encompass gateline paddles that may include a paddle body having a composite material forming an outer surface of the paddle body. The composite material may have a first surface and a second surface opposite the first surface that define an open interior therebetween. The composite material may include a fiber-reinforced resin. The paddle body may include a cellular reinforcement member disposed within the open interior. The paddle body may include a mounting region formed along a lateral edge of the paddle body. The paddle body may include a mounting block disposed within a portion of the open interior disposed within the mounting region.

In some embodiments, the mounting region may protrude laterally from the lateral edge of the paddle body. The cellular reinforcement member may include a honeycomb cellular structure. Cells of the cellular honeycomb structure may extend along a length of the paddle body. Cells of the cellular honeycomb structure may each have a width of between about 0.0625 inches and 0.75 inches. The gateline paddle may have a weight of less than about 2.5 kg. A thickness of the composite material may be greater within the mounting region than in a main portion of the paddle body.

Some embodiments of the present invention may encompass gateline paddles having a paddle body that includes a composite material forming an outer surface of the paddle body. The composite material may have a first surface and a second surface opposite the first surface that define an open interior therebetween. The composite material may include a fiber-reinforced resin. The paddle body may include a cellular reinforcement member disposed within the open interior and filling a space between the first surface and the second surface. The paddle body may include a mounting region formed along a lateral edge of the paddle body. A thickness of the composite material may vary along a width of the paddle body and may be greatest within the mounting region. The paddle body may include a mounting block disposed within a portion of the open interior disposed within the mounting region.

In some embodiments, the fiber-reinforced resin may include a polyfurfuryl alcohol resin. The fiber-reinforced resin may include one or both of glass fibers and carbon fibers. The thickness of the composite material within the mounting region may be at least four times thicker than in a main body of the paddle body. The mounting region may protrude laterally from the lateral edge of the paddle body and may include a fillet that extends between a mounting edge of the mounting region and the lateral edge of the paddle body. Variations of the thickness of the composite material may be caused by providing different numbers of sheets of the composite material in different regions of the paddle body. The paddle body may include an inner edge positioned opposite the lateral edge. The inner edge may include reinforcement sheets of the composite material.

Some embodiments of the present technology may encompass gateline paddles having a paddle body that includes a composite material forming an outer surface of the paddle body. The composite material may have a first surface and a second surface opposite the first surface that define an open interior therebetween. The composite material may include a polyfurfuryl alcohol resin that is reinforced with one or both of glass fibers and carbon fibers. The paddle body may include a cellular reinforcement member disposed within the open interior and filling a space between the first surface and the second surface. The paddle body may include a mounting region formed along a lateral edge of the paddle body. The paddle body may include a mounting block disposed within a portion of the open interior disposed within the mounting region.

In some embodiments, the composite material may be bonded to the cellular reinforcement member and the mounting block using a polymeric adhesive film. The mounting block may be bonded to the cellular reinforcement member using a polymeric adhesive film. The cellular reinforcement member may include aluminum. The mounting block may include aluminum. The composite material may include between about 30% and 50% by weight of the polyfurfuryl alcohol resin.

BRIEF DESCRIPTION OF THE DRAWINGS

A further understanding of the nature and advantages of the disclosed technology may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION OF THE INVENTION

Embodiments of the present invention are directed to gate paddles and/or other barriers that are lightweight and fully fire safety compliant for use in automatic gate applications. The reduced weight of the gate paddles (which may be less than half the weight of conventional paddles) may significantly reduce the wear on the paddle motor drive train, while the materials used to fabricate the gate paddle may satisfy fire safety standards. Additionally, embodiments of the present invention may include low-friction surfaces on one or both sides of the gate barrier. The low-friction surfaces may be provided on user-facing surfaces, and may help prevent people and/or objects from being entrapped by the gate barriers. While discussed primarily in the context of automated gatelines, such as those used in transit applications, it will be appreciated that the present technology is not so limited, and that the gate barrier designs described herein may be used in any access control equipment that requires a physical barrier to prevent unwanted entry and/or exit.

Figure 1:
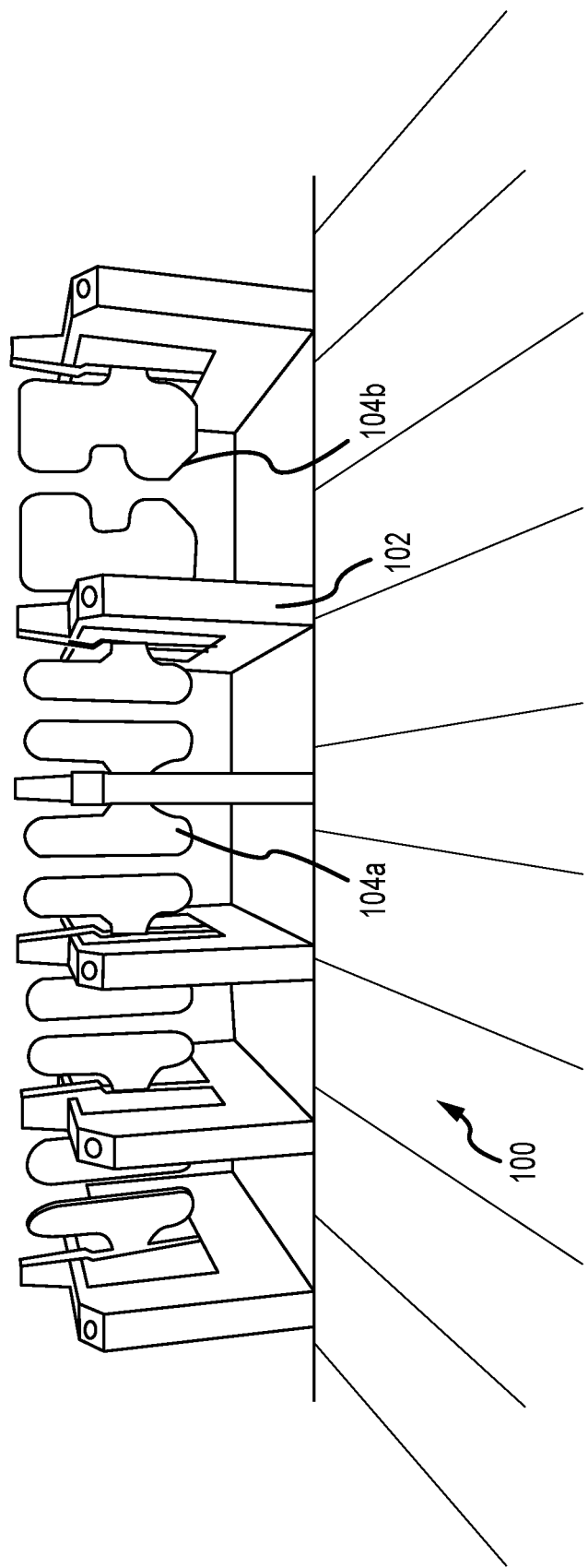
FIG. 1 illustrates a gateline according to embodiments of the present invention.

Turning now to FIG. 1, one embodiment of a gate system 100 is illustrated. Gate system 100 may include a number of stanchions 102, which may define lateral boundaries of a given gateline and which may house or otherwise include access credential validation equipment (such as NFC readers, cameras, barcode readers, Bluetooth beacons, biometric readers (e.g., scanners for fingerprint, facial recognition, voice recognition, retinal, etc.), and/or other access credentials) and/or gate actuation devices (e.g., motors, gearboxes, sensor systems (e.g., force, proximity, object detection, etc.)), and/or other equipment that is used in the operation of the gate system 100. In some embodiments, the drive mechanisms of gate system 100 may operate with software and/or sensors that may reduce opening and closing force of barriers in the event that a person or object is detected within the barrier. One or more paddles 104 and/or other barriers may be provided between a pair of stanchions 102. For example, as illustrated one paddle 104 is pivotally coupled with each interior-facing side of a respective one of the stanchions 102. The actuation devices of the stanchions 102 may operate to move the paddles 104 between open and/or closed positioned based on the presence of a user and/or based on a validation result of an access credential. In some embodiments, a stanchion 102 may define the boundary for and/or include a paddle 104 for multiple gatelines. For example, stanchions 102 on the interior of the gate system 100 may define a boundary of two parallel gatelines, while outermost stanchions 102 of the gate system 100 may define a single gateline that is positioned on an interior-facing side of the stanchion 102.

Each gateline within the gate system 100 may be the same (e.g., a same lane width, same equipment size/style, etc.) in some embodiments, while in other embodiments one or more of the gatelines may be different. For example, the gate system 100 may include gatelines of different widths (e.g., standard gatelines and accessibility gatelines), with each type of gateline including a different spacing between paddles 104, a different type of paddle 104, and/or a different size of paddle 104. The use of standard gatelines (e.g., with paddles 104a) may provide a greater efficiency (e.g., use of space) to increase throughput, while accessibility gatelines (e.g., with paddles 104b) may be used to provide more room for patrons with mobility issues, luggage, and/or other circumstances that require more space and/or time to clear a gateline. In some embodiments, the drive mechanisms of the standard gatelines and the accessibility gatelines may operate in the same manner, while in other embodiments the drive mechanisms of the different gatelines may operate differently. As just one example, the accessibility gatelines may hold the paddles 104b open longer, slow down and/or reduce the closing force of the paddles 104b, and/or perform another action that may improve the ability of users to pass through the accessibility gateline.

Each paddle 104 may include and/or be coupled with a paddle shaft (or other mechanism that transmits the force from the actuator to the paddles 104), which may be rotatably coupled with a drive system or other actuator of the gate system 100. For example, each paddle shaft may extend into and/or be otherwise coupled with a rotary actuator of the gate system 100. Upon actuation of the rotary actuator, such as upon successful validation of a patron, the rotary actuator may rotate the paddle shaft, which may cause paddle 104 that is coupled with the paddle shaft to pivot relative to the stanchion 102 to open and/or close the gateline. The paddle shaft may be formed from a material such as aluminum and/or stainless steel, in some embodiments.

Figure 2:
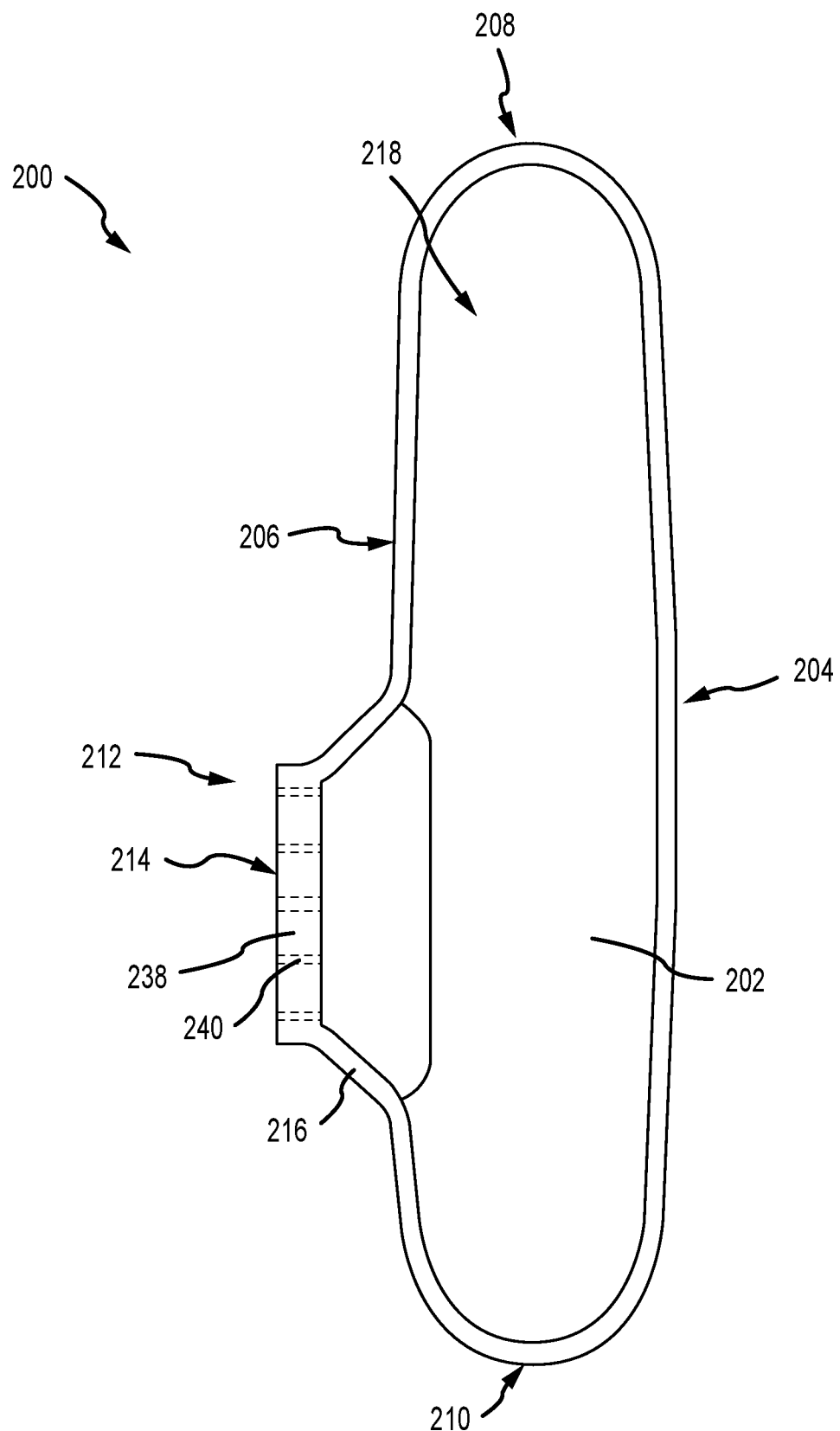
FIG. 2 illustrates a schematic front elevation view of a paddle according to embodiments of the present invention.
Figure 2B:
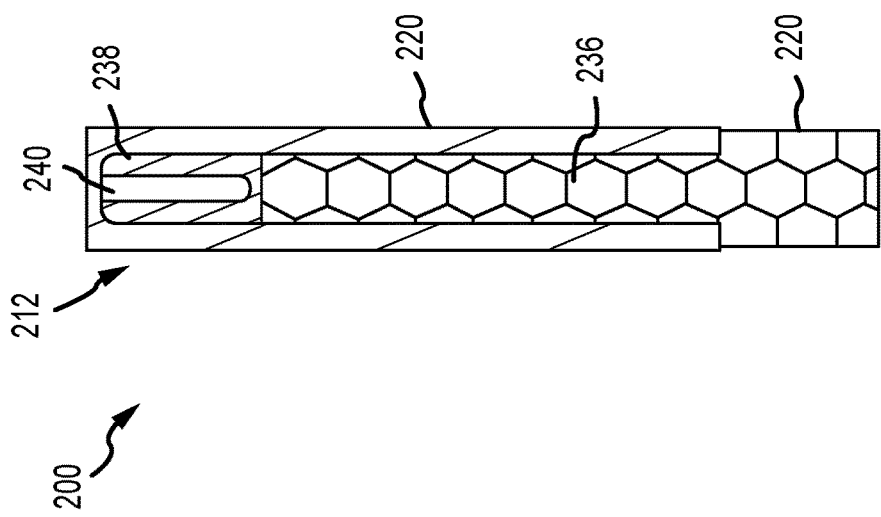
FIG. 2B illustrates a cross-sectional view of the paddle of FIG. 2.
Figure 2A:
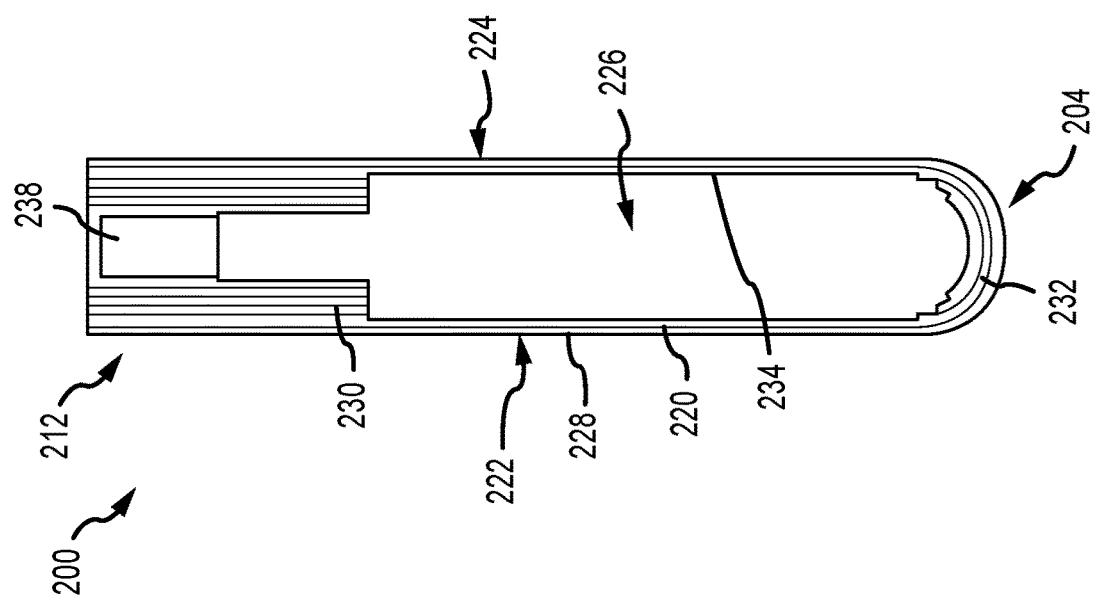
FIG. 2A illustrates a cross-sectional view of the paddle of FIG. 2.
Figure 2C:
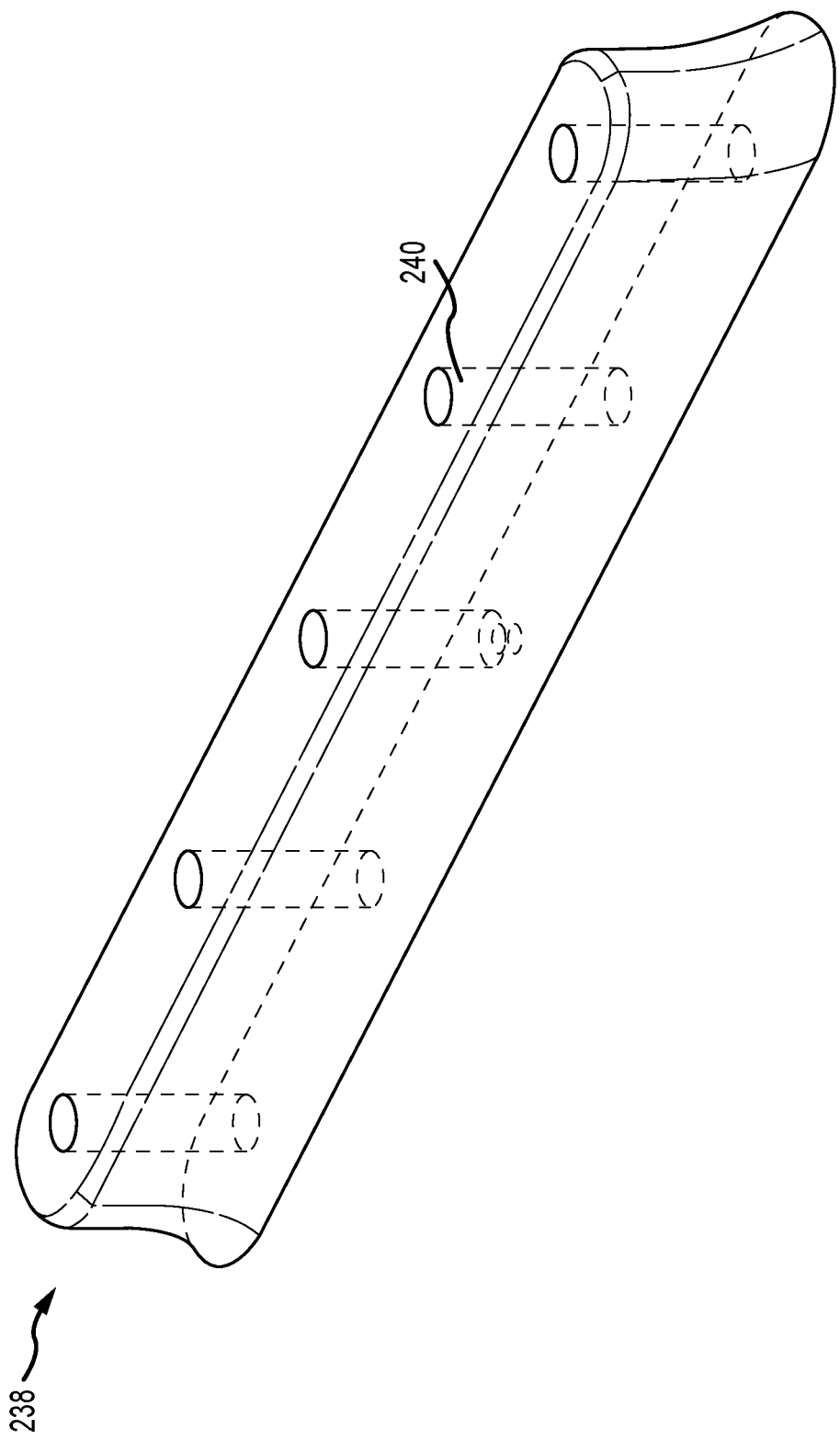
FIG. 2C illustrates a schematic isometric view of a mounting block of the paddle of FIG. 2.

Turning now to FIGS. 2-2C, one embodiment of a gateline paddle 200 is illustrated. Paddle 200 may be used as a barrier of a gateline for a gate system (including gate system 100) and/or any other access control system. For example, paddle 200 may be used as paddle 104a described above, and may be coupled with an actuator of one of the stanchions 102 that may rotate, pivot, and/or otherwise move the paddle 200 between an open position and a closed position. The paddle 200 may include a paddle body 202, which may have any profile shape. As illustrated, the paddle body 202 has a generally stadium shaped, with an inner lateral edge 204, an outer lateral edge 206, a top edge 208, and a bottom edge 210. The lateral edges 204, 206 may be substantially linear in some embodiments, however in other embodiments the lateral edges 204, 206 may include some bowing, tapering, and/or other curvature. The top and bottom edges 208, 210 may be generally semicircular in some embodiments, although may have other arcs/curvatures and/or may be generally linear in some embodiments. The paddle body 202 may include a mounting region 212, which may be formed along a portion of the outer lateral edge 206. The mounting region 212 may be used to secure the paddle 200 to an actuator of a stanchion or other support mechanism. In some embodiments, the mounting region 212 may protrude laterally outward from the outer lateral edge 206 of the paddle body 202, which may ensure that the outer lateral edge 206 is spaced apart from and has clearance to move relative to the stanchion or other support device. In some embodiments, the mounting region 212 includes and/or is otherwise coupled with one or more fillets 216 that extend between and couple a mounting edge 214 of the mounting region 212 and the outer lateral edge 206 of the paddle body 202. The fillets 216 provide areas of increased material that may strengthen the connection between the mounting region 212 and a main portion 218 (e.g., a portion that serves to block access of a gateline when the paddle 200 is in a closed position) of the paddle body 202.

FIG. 2A illustrates a cross-sectional view of paddle 200. As illustrated, paddle body 202 may include a composite material 220 that forms an outer surface of the paddle body 202. For example, in some embodiments the composite material 220 may encapsulate all or a substantial portion of (e.g., at least 90%, at least 95%, at least 99%, or more) of interior components of the paddle body 202. In some embodiments, the composite material 220 may be provided as a number of layers, sheets, or plies, with a number and thickness of each layer determining a total thickness of the composite material 220 at a given location on the paddle body 202. In some embodiments, each of the layers may be identical (e.g., same composition, width, thickness, and/or other characteristic) while in other embodiments some or all of the layers may be different (e.g., different composition, width, thickness, and/or other characteristic).

In some embodiments, an outer layer 228 of the composite material 220 may wrap around one or both lateral edges of the paddle body 202 and may form a first surface 222 and a second surface 224 opposite the first surface 222. The first surface 222 and second surface 224 may be spaced apart from one another such that an open interior 226 is formed therebetween. In a particular embodiment, the outer layer 228 of the composite material 220 may be thinner and/or less dense than interior layers that may be used to reinforce the outer layer 228. For example, the outer layer 228 may have a density of between about 150 and 350 grams per square meter (gsm), between about 175 and 325 gsm, between about 200 and 300 gsm, or between about 225 and 275 gsm. Interior layers may have densities of between 350 gsm and 1000 gsm, between 400 gsm and 950 gsm, between 450 gsm and 900 gsm, between 500 gsm and 850 gsm, between 550 gsm and 800 gsm, between 600 gsm and 750 gsm, or between 650 gsm and 700 gsm. It will be appreciated that the densities described herein are only meant as examples and that higher or lower densities of composite material may be used in various embodiments.

A thickness of the composite material 220 may vary across a width (e.g., a lateral dimension extending through the lateral sides 204, 206) of the paddle body 202. For example, a thickness of the composite material 220 may be greatest within the mounting region 212, smallest within the main portion 218, and at an intermediate level proximate the inner lateral edge 204. Variations in the thickness of the composite material 220 may be caused by providing different numbers of sheets, plies, or layers of the composite material 220 at various regions of the paddle body 202 and/or by varying the thickness of one or more of the layers of the composite material 220. The thickness of the composite material 220 may be increased in areas that are likely to be subjected to the highest stresses and/or other forces. For example, the mounting region 212 may be subject to the highest forces due to the proximity to the actuator and the moment generated by the weight of the paddle 200 and/or any forces applied to the main portion 218 and/or inner lateral edge 204. In some embodiments, a thickness of the composite material 220 within the mounting region 212 may be at least two times, at least three times, at least four times, at least five times, at least six times, at least seven times, at least eight times, at least nine times, at least ten times, or more than a thickness of the composite material 220 within the main portion 218. For example, a number of reinforcement sheets, plies, or layers 230 may be provided within the mounting region 212. The mounting region 212 may include at least or about one reinforcement layer, at least or about two reinforcement layers, at least or about four reinforcement layers, at least or about six reinforcement layers, at least or about eight reinforcement layers, at least or about ten reinforcement layers, at least or about twelve reinforcement layers, at least or about fourteen reinforcement layers, at least or about sixteen reinforcement layers, at least or about eighteen reinforcement layers, at least or about twenty reinforcement layers, or more. In some embodiments, the reinforcement layers 230 may be divided into to sections, with each section being positioned against and/or proximate a respective side of the outer layer 228. In some embodiments, each section may have an equal number of reinforcement layers 230, while in other embodiments, the sections may have different numbers of reinforcement layers 230. In some embodiments, the sections include multiple reinforcement layers 230 positioned against and/or coupled together to form rectangular prisms of reinforcement material, with each reinforcement layer 230 having a same length and width, although other configurations are possible in various embodiments.

As illustrated, the inner lateral edge 204 may include a number of reinforcement layers or sheets 232. For example, at least or about one, at least or about two, at least or about three, at least or about four, or more reinforcement sheets 232 of composite material 220 may be positioned within the outer layer 228 of composite material 220 at or proximate the inner lateral edge 204. In some embodiments, each reinforcement sheet 232 may have a same length and/or width. In other embodiments, some or all of the reinforcement sheets 232 may have different dimensions. For example, as illustrated, an outermost one of the reinforcement sheets 232 may have a greatest width, with each successive reinforcement sheet 232 in an inward direction having a smaller width, although other configurations are possible.

In some embodiments, in addition to the outer layer 228, the composite material 220 may include an inner layer 234, which may be adjacent to and/or coextensive with the outer layer 228. The inner layer 234 may be disposed between the outer layer 228 and any reinforcement layers and/or sheets. The inner layer 234 and the outer layer 228 may have identical compositions in some embodiments, while in others the layers may be different. For example, the inner layer 234 may have a greater density than the outer layer 228. As just one example, the inner layer 234 may have a density of between 350 gsm and 1000 gsm, between 400 gsm and 950 gsm, between 450 gsm and 900 gsm, between 500 gsm and 850 gsm, between 550 gsm and 800 gsm, between 600 gsm and 750 gsm, or between 650 gsm and 700 gsm in some embodiments.

The composite material 220 may include a fiber-reinforced resin. For example, fibers, such as (but not limited to) glass fibers and/or carbon fibers, may be woven, randomly oriented, and/or otherwise arranged and saturated with a resin material. In some embodiments, the fibers may be woven in a twill pattern, such as a 1×1 twill, a 2×2 twill, a 3×3 twill, a 4×4 twill, etc. The fibers and resin may be cured, such as using techniques including vacuum bag/oven curing, autoclave curing, and/or press molding curing processing. The resin may include a thermosetting resin, such as a phenolic resin. In a particular embodiment, the resin may include a polyfurfuryl alcohol resin, which may be a bioresin (e.g., derived from crop waste) in some embodiments. The resin may be present in the composite material 220 in various amounts, such as between about 30% and 50% by weight of the composite material 220, and more commonly between about 35% and 45% by weight. In some embodiments, the composition of the composite material 220 may vary by sheet or layer of the composite material 220. For example, the outer layer 228 may have a greater resin content (e.g., between 40% and 50% by weight, more commonly between 40% and 45% by weight) than the inner layer 234 and/or reinforcement layers/sheets, which may commonly have a resin content of between 30% and 40%, and more commonly between 35% and 40%. It will be appreciated that other resin contents are possible, and that in some embodiments each piece of composite material 220 used in paddle body 202 may have an identical composition.

The composite material 220 may provide fire retardant properties to the paddle 200, as well as provide a strong, yet lightweight outer skin or shell for the paddle 200. Additionally, the composite material 220 may provide a low-friction user-contacting surface that may help prevent patrons from being stuck between paddles that close on the patron. The use of a bioresin, such as a polyfurfuryl alcohol resin, may ensure that the composite material 220 may have a low toxicity, low VOC emissions, and a low environmental impact. The composite material 220 may withstand operating temperatures of up to 200° C. and may be stored in or otherwise withstand temperatures as low as −18° C. for up to 6 months. In some embodiments, the fibers within the composite material 220 may be woven to have a herringbone pattern.

In some embodiments, a cellular reinforcement member 236 may be disposed within the open interior 226 as illustrated in FIG. 2B. For example, the cellular reinforcement member 236 may extend between and/or fill a space between the first surface 222 and the second surface 224 of the composite material 220. In some embodiments, the cellular reinforcement member 236 may have a honeycomb cellular structure, although other cellular structures are possible in various embodiments. As illustrated, the cells of the honeycomb structure (or other cellular structure) of the cellular reinforcement member 236 extend vertically along a length of the paddle body 202. However, in other embodiments, the cells may be oriented at different angles. Individual cells of the cellular honeycomb structure each have a width of between about 0.0625 inches and 0.75 inches, more commonly between or about 0.125 inches and 0.375 inches. The cells may have various shapes, such as pentagonal shapes, hexagonal shapes, octagonal shapes, and/or other polygonal shapes. In some embodiments, the walls of the cells may be solid along a length of the cell, while in other embodiments, the cells may be perforated along the length. The cellular reinforcement member 236 may be formed from strong, lightweight materials, including (but not limited to) metals such as aluminum and/or titanium. The cellular reinforcement member 236 provides compressive strength to the paddle body 202 while adding minimal weight. This may enable the entire paddle body to have a weight of less than or about 2.5 kg. The thickness of the cellular reinforcement member 236 at any position within the open interior 226 may be determined based on a corresponding thickness of the composite material 220. For example, in areas where the composite material 220 is thicker the open interior 226 is narrower such that a thinner portion of cellular reinforcement member 236 is needed to span the distance between opposing surfaces of the composite material 220.

In some embodiments, the cellular reinforcement member 236 may be coupled with the composite material 220 via adhesive bonding. As just one example, a polymeric adhesive film or web may be positioned between surfaces of the cellular reinforcement member 236 and the composite material 220 to bond the materials together. In a particular embodiment, the polymeric film may include a thermoplastic adhesive film that may be positioned between the materials. The paddle body 202 may be placed in a heating device, such as an autoclave, oven, or other heater that may heat the paddle body 202 to a temperature that exceeds a melting point of the film, which may melt the film and enable the film to bond the materials together once cooled/cured.

The paddle body 202 may include a mounting block 238, which may be disposed within a portion of the open interior 226 of the mounting region 212. For example, an edge of the mounting block 238 may be positioned at or proximate the mounting edge 214 of the mounting region 212. The mounting block 238 may be formed from a lightweight, strong material, such as (but not limited to) aluminum. For example, a block of aluminum may be machined and/or otherwise formed to fit within the open interior 226. The mounting block 238 may include one or more coupling mechanisms, such as threaded receptacles 240, that may enable the paddle body 202 to be coupled with a an actuator of a stanchion or other support, such as by inserting a fastener (such as a screw or bolt) into each threaded receptacle 240. A thickness length, and/or width of the mounting block 238 may be selected based on a size and/or weight of the paddle body 202 to ensure that the mounting block 238 provides sufficient strength to support and facilitate movement of the paddle body 202. Similarly, a number and/or dimensions of the threaded receptacles 240 may be selected based on a size and/or weight of the paddle body 202 to ensure that the combination of fasteners and threaded receptacles 240 provides sufficient strength to support and facilitate movement of the paddle body 202. In some embodiments, the mounting block 238 may have a tapered profile, such as illustrated in FIG. 2C. For example, the sidewalls of the mounting block 238 may flare outward, with a non-linear taper in an outward direction from an outermost edge to an innermost edge of the mounting block 238, which may enable a shape of the mounting block 238 to more closely match a contour provided by the fillets 216. The taper may be contoured with a constant radius or a varying radius or degree of curvature. It will be appreciated that the mounting block 238 may have other shapes as well, such as having linear sidewalls.

In some embodiments, the mounting block 238 may be fully encapsulated within the composite material 220, with access to the threaded receptacles 240 being provided via apertures (not shown) that are formed in the composite material 220 of the mounting edge 214 and in alignment with the threaded receptacles 240. In other embodiments, an outermost surface of the mounting block 238 may be exposed through an aperture (not shown) in the mounting edge 214 of the mounting region 212 that may match a size and/or shape of the mounting block 238 in some embodiments. An innermost surface of the mounting block 238 may contact the cellular reinforcement member 236. Major surfaces of the mounting block 238 may contact inner surfaces of the composite material 220 within a portion of the mounting region 212, and may entirely fill the distance between opposing surfaces of the composite material 220. For example, the mounting block 238 may fill the entire space between opposing sections of the reinforcement layers 230. In some embodiments, the cellular reinforcement member 236 and mounting block 238 may not overlap, with each component individually spanning a full distance between opposing surfaces of the composite material 220. In other embodiments, there may be some overlap such that portions of each component span the full distance between opposing surfaces of the composite material 220 at one or more regions of the paddle body 202.

The mounting block 238 may be coupled with the composite material 220 and/or the cellular reinforcement member 236 using adhesive bonding. As just one example, a polymeric adhesive film or web may be positioned between surfaces of the mounting block 238 and the cellular reinforcement member 236 and/or the composite material 220 to bond the materials together. In a particular embodiment, the polymeric film may include a thermoplastic adhesive film that may be positioned between the materials. The paddle body 202 may be placed in a heating device, such as an autoclave, oven, or other heater that may heat the paddle body 202 to a temperature that exceeds a melting point of the film, which may melt the film and enable the film to bond the materials together once cooled/cured. The adhesive may be the same or different as the adhesive used to bond the cellular reinforcement member 236 with the composite material 220.

Figure 3:
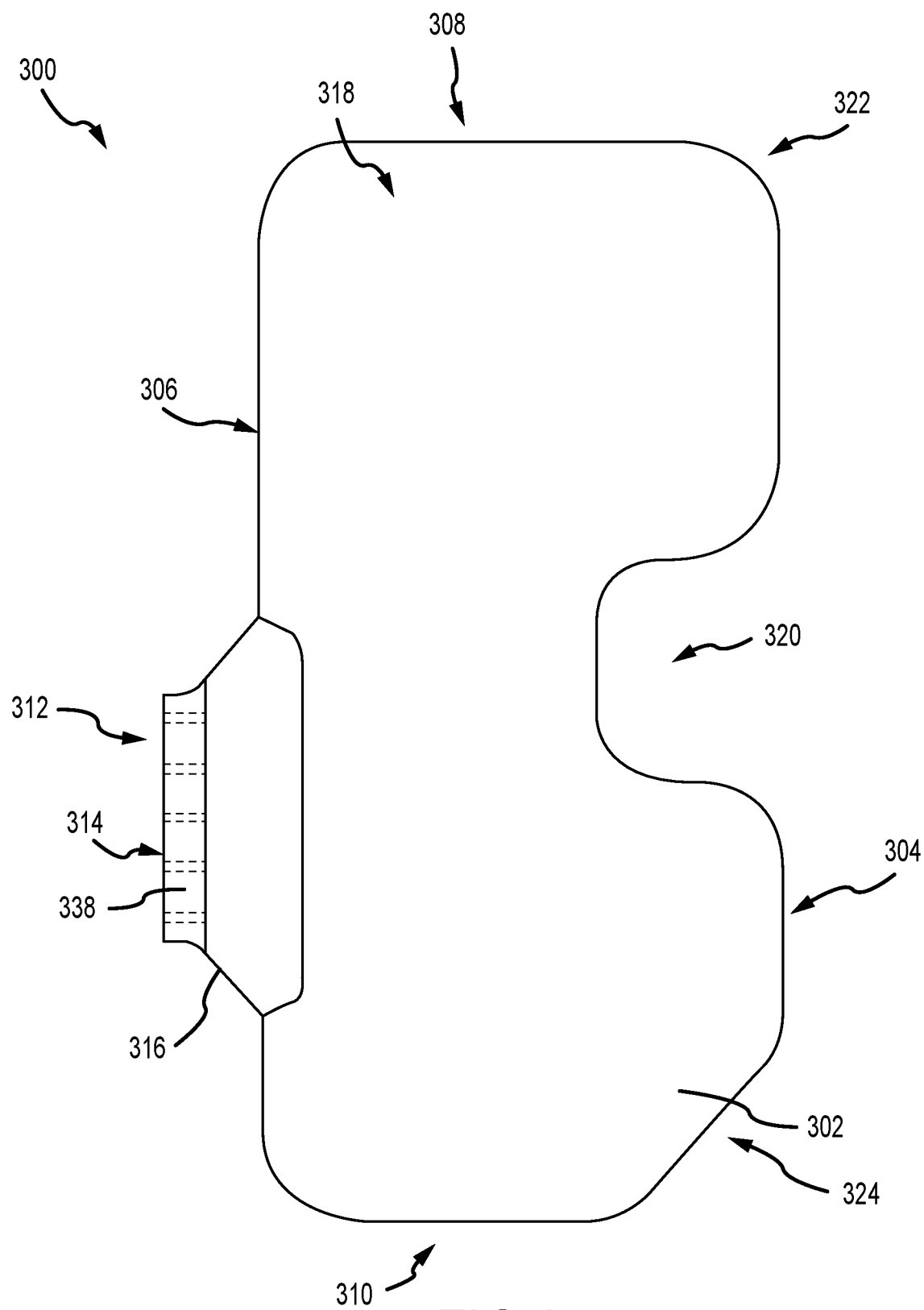
FIG. 3 illustrates a schematic front elevation view of a paddle according to embodiments of the present invention.

FIG. 3 illustrates another embodiment of a paddle 300. Paddle 300 may be larger than paddle 200 described above, and may be used as a paddle for an accessibility gateline in some embodiments, while paddle 200 may be used as a paddle in a standard gateline. Paddle 300 may be used as a barrier of a gateline for a gate system (including gate system 100) and/or any other access control system. For example, paddle 300 may be used as paddle 104b described above, and may be coupled with an actuator of one of the stanchions 102 that may rotate, pivot, and/or otherwise move the paddle 300 between an open position and a closed position. The paddle 300 may include a paddle body 302, which may have any profile shape. As illustrated, the paddle body 302 has an inner lateral edge 304, an outer lateral edge 306, a top edge 308, and a bottom edge 310. The lateral edges 304, 306 may be substantially linear in some embodiments, however in other embodiments the lateral edges 304, 306 may include non-linear designs. For example, as illustrated, the inner lateral edge 304 may include an inward cutout 320, which may help reduce the weight of the paddle body 302, while still providing one or more portions of the inner lateral edge 304 that extend into a gateline a sufficient distance so as to impede passage of patrons when the paddles 300 are in a closed position. The top and bottom edges 308, 310 may be generally linear in some embodiments, although may have other shapes in some embodiments. A top corner 322 (e.g., coupling the top edge 308 and inner lateral edge 304) may be generally rounded, with a constant or varying degree of curvature. A bottom corner 324 (e.g., coupling the bottom edge 310 and inner lateral edge 304) be angled, which may reduce the weight of the paddle body 302, while still providing one or more portions of the inner lateral edge 304 that extend into a gateline a sufficient distance so as to impede passage of patrons when the paddles 300 are in a closed position. The paddle body 302 may include a mounting region 312, which may be formed along a portion of the outer lateral edge 306. The mounting region 312 may be used to secure the paddle 300 to an actuator of a stanchion or other support mechanism. In some embodiments, the mounting region 312 may protrude laterally outward from the outer lateral edge 306 of the paddle body 302, which may ensure that the outer lateral edge 306 is spaced apart from and has clearance to move relative to the stanchion or other support device. In some embodiments, the mounting region 312 includes and/or is otherwise coupled with one or more fillets 314 that extend between and couple a mounting edge 316 of the mounting region 312 and the outer lateral edge 306 of the paddle body 302. The fillets 314 provide areas of increased material that may strengthen the connection between the mounting region 312 and a main portion 318 (e.g., a portion that serves to block access of a gateline when the paddle 300 is in a closed position) of the paddle body 302.

An interior structure of the paddle body 302 may be similar to that described in relation to paddle 200. For example, the paddle body 302 may include an outer skin or surface of composite material, which may have a thickness that varies across a width of the paddle body 302. The composite material may be thickest within the mounting region 312, thinnest within the main portion 318, and may include reinforcement sheets at the inner lateral edge 304. The composite material may define an open interior that receives a cellular reinforcement member and a mounting block 338, which may be positioned within the mounting region 312 proximate the mounting edge 316.

The paddle bodies shown in FIGS. 2-3 are merely provided as examples. It will be appreciated that other paddle designs are possible in various embodiments. In particular, the profile shape (e.g., a shape of the paddle when viewed by a patron approaching a gateline with closed paddles) may be selected to have any geometry and dimensions that suits the needs or other design aspects of a particular application.

In some embodiments, the materials used to form the paddle may be oriented to give patrons visual assistance through the gateline. For example, when the fibers of the composite material are oriented in a herringbone pattern, the lines of the herringbone pattern may be aligned at an angle (such as, but not limited to, 45 degrees) to direct patrons to a center of a given gateline. In some embodiments, an external color of materials used may be neutral black, which may remove the need for multiple elastomer coating colors. In some embodiments, the outer surface of the paddles may have a surface finish that is unaffected by UV light and airborne ozone. The finish may have a gloss level of less than about 50% in some embodiments to prevent unwanted station lighting or direct sunlight reflections and be consistent over the whole paddle surface. The composite material, when used as the outermost surface of the paddle body, may provide a low-friction surface that may help reduce entrapments of patrons, animals, and/or objects. The coefficient of friction of the paddles may be selected to be sufficiently low so as to not grip or hold any passengers clothing or luggage or similar around a periphery of the paddle or cause friction burns to skin. Additionally, the composite material may eliminate the need to include a soft, impact-absorbing material (such as rubber) about an outer surface of the paddle body. This may enable the paddle body to resist wear better than conventional paddles as the rubber used in conventional paddles includes additives to improve the fire retardancy, but that make the rubber less durable. As noted above, the resins used to fabricate the composite material may be sufficiently fire retardant such that no further fire retardant additives are needed.

Such paddle designs may also provide a lightweight design that also fully satisfy fire safety standards. The low weight of the paddle may help reduce wear of the drive components of gate systems (such as gate system 100) and may prevent sagging of the paddle over time. In some embodiments, the paddles may have a weight of no more than 2.5 kg (for standard paddles 200) and 4.5 kg (for the wider accessibility paddles 300), although the weight may vary based on the size and geometry of a given paddle.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A gateline paddle, comprising:
   a paddle body comprising:
      a composite material forming an outer surface of the paddle body, the composite material having a first surface and a second surface opposite the first surface that define an open interior therebetween, wherein the composite material comprises a fiber-reinforced resin;
      a cellular reinforcement member disposed within the open interior;
      a mounting region formed along a lateral edge of the paddle body; and
      a mounting block disposed within a portion of the open interior disposed within the mounting region.

2. The gateline paddle of claim 1, further comprising: the mounting region protrudes laterally from the lateral edge of the paddle body.

3. The gateline paddle of claim 1, wherein: the cellular reinforcement member comprises a honeycomb cellular structure.

4. The gateline paddle of claim 3, wherein:
cells of the cellular honeycomb structure extend along a length of the paddle body.

5. The gateline paddle of claim 3, wherein:
cells of the cellular honeycomb structure each have a width of between about 0.0625 inches and 0.75 inches.

6. The gateline paddle of claim 1, wherein:
the gateline paddle has a weight of less than about 2.5 kg.

7. The gateline paddle of claim 1, wherein:
a thickness of the composite material is greater within the mounting region than in a main portion of the paddle body.

8. A gateline paddle, comprising:
a paddle body comprising:
- a composite material forming an outer surface of the paddle body, the composite material having a first surface and a second surface opposite the first surface that define an open interior therebetween, wherein the composite material comprises a fiber-reinforced resin;
- a cellular reinforcement member disposed within the open interior and filling a space between the first surface and the second surface;
- a mounting region formed along a lateral edge of the paddle body, wherein a thickness of the composite material varies along a width of the paddle body and is greatest within the mounting region; and
- a mounting block disposed within a portion of the open interior disposed within the mounting region.

9. The gateline paddle of claim 8, wherein:
the fiber-reinforced resin comprises a polyfurfuryl alcohol resin.

10. The gateline paddle of claim 8, wherein:
the fiber-reinforced resin comprises one or both of glass fibers and carbon fibers.

11. The gateline paddle of claim 8, wherein:
the thickness of the composite material within the mounting region is at least four times thicker than in a main body of the paddle body.

12. The gateline paddle of claim 8, wherein:
the mounting region protrudes laterally from the lateral edge of the paddle body and comprises a fillet that extends between a mounting edge of the mounting region and the lateral edge of the paddle body.

13. The gateline paddle of claim 8, wherein:
variations of the thickness of the composite material are caused by providing different numbers of sheets of the composite material in different regions of the paddle body.

14. The gateline paddle of claim 8, wherein:
the paddle body comprises an inner edge positioned opposite the lateral edge; and
the inner edge comprises reinforcement sheets of the composite material.

15. A gateline paddle, comprising:
a paddle body comprising:
- a composite material forming an outer surface of the paddle body, the composite material having a first surface and a second surface opposite the first surface that define an open interior therebetween, wherein the composite material comprises a polyfurfuryl alcohol resin that is reinforced with one or both of glass fibers and carbon fibers;
- a cellular reinforcement member disposed within the open interior and filling a space between the first surface and the second surface;
- a mounting region formed along a lateral edge of the paddle body; and
- a mounting block disposed within a portion of the open interior disposed within the mounting region.

16. The gateline paddle of claim 15, wherein:
the composite material is bonded to the cellular reinforcement member and the mounting block using a polymeric adhesive film.

17. The gateline paddle of claim 15, wherein:
the mounting block is bonded to the cellular reinforcement member using a polymeric adhesive film.

18. The gateline paddle of claim 15, wherein:
the cellular reinforcement member comprises aluminum.

19. The gateline paddle of claim 15, wherein:
the mounting block comprises aluminum.

20. The gateline paddle of claim 15, wherein:
the composite material comprises between about 30% and 50% by weight of the polyfurfuryl alcohol resin.

* * * * *